US010722085B2

(12) United States Patent
Gao et al.

(10) Patent No.: US 10,722,085 B2
(45) Date of Patent: Jul. 28, 2020

(54) BLOWER/VACUUM APPARATUS (71) Applicant: Positec Power Tools (Suzhou) Co., Ltd, Suzhou (CN)

(72) Inventors: Zhendong Gao, Suzhou (CN); Andrea Cestonaro, Suzhou (CN); Xiahong Zha, Suzhou (CN); Fengli Zhao, Suzhou (CN); Lixiang Huo, Suzhou (CN)

(73) Assignee: Positec Power Tools (Suzhou) Co., Ltd, Suzhou (CN)

( * ) Notice: Subject to any disclaimer, the term of this patent is extended or adjusted under 35 U.S.C. 154(b) by 264 days.

(21) Appl. No.: 15/531,226

(22) PCT Filed: Nov. 25, 2015

(86) PCT No.: PCT/CN2015/095513
§ 371 (c)(1),
(2) Date: May 26, 2017

(87) PCT Pub. No.: WO2016/082759
PCT Pub. Date: Jun. 2, 2016

(65) Prior Publication Data
US 2017/0325642 A1 Nov. 16, 2017

(30) Foreign Application Priority Data
Nov. 28, 2014 (CN) .......................... 2014 1 0708685

(51) Int. Cl.
*A47L 5/14* (2006.01)
*F04D 25/08* (2006.01)
(Continued)

(52) U.S. Cl.
CPC ................ *A47L 5/14* (2013.01); *A01B 51/02* (2013.01); *A01G 20/47* (2018.02); *E01H 1/08* (2013.01);
(Continued)

(58) Field of Classification Search
CPC ... A47L 5/14; A47L 5/225; A47L 5/24; A47L 9/08; A47L 9/2842; A01G 20/47;
(Continued)

(56) References Cited

U.S. PATENT DOCUMENTS 5,604,954 A * 2/1997 Webster ................. A01G 20/47
15/330
6,351,870 B1 * 3/2002 Moritsch ................... A47L 7/00
15/321

(Continued)

FOREIGN PATENT DOCUMENTS

CN 101135139 A 3/2008
CN 101322625 A 12/2008
(Continued)

OTHER PUBLICATIONS

Foreign Translation (Year: 2014).*
(Continued)

*Primary Examiner* — Monica S Carter
*Assistant Examiner* — Abbie E Quann
(74) *Attorney, Agent, or Firm* — TraskBritt (57) ABSTRACT The present invention relates to a blowing-suction device, selectively operating in a blowing mode or a suction mode, comprising: a main body; a motor located inside the main body, the motor having a motor shaft providing rotational motion; a fan assembly driven by the motor to rotate; and a blowing assembly and a suction assembly connected to the main body; wherein the fan assembly includes an axial fan that, while in the blowing mode, the blowing assembly is connected to the main body, and wherein the axial fan rotates around a first rotary shaft, and, while in the suction mode, the suction assembly is connected to the main body.

15 Claims, 9 Drawing Sheets (51) Int. Cl.
  *F04D 19/00* (2006.01)
  *F01D 17/16* (2006.01)
  *E01H 1/08* (2006.01)
  *A47L 5/00* (2006.01)
  *F04D 29/40* (2006.01)
  *A01G 20/47* (2018.01)
  *A01B 51/02* (2006.01)
  *F04D 17/16* (2006.01)
  *E01H 1/00* (2006.01)

(52) U.S. Cl.
  CPC ........... *E01H 1/0863* (2013.01); *F04D 17/16* (2013.01); *F04D 19/002* (2013.01); *F04D 25/084* (2013.01); *F04D 29/403* (2013.01); *A47L 5/00* (2013.01); *E01H 1/00* (2013.01); *F05D 2250/51* (2013.01); *F05D 2250/52* (2013.01)

(58) Field of Classification Search
  CPC .......... A01G 20/43; A01B 51/02; E01H 1/08; E01H 1/0863; E01H 1/0809; F04D 17/16; F04D 19/002; F04D 25/084; F04D 29/403; F04D 19/005; F04D 25/06; B08B 5/00; B08B 5/02
  USPC ......................................................... 15/330
  See application file for complete search history.

(56) References Cited

U.S. PATENT DOCUMENTS

| | | | | |
|---|---|---|---|---|
| 7,735,188 B2 * | 6/2010 | Shaffer | ................. | E01H 1/0809 15/405 |
| 7,748,078 B2 * | 7/2010 | Andriolo | ............... | E01H 1/0836 15/330 |
| 9,138,113 B2 * | 9/2015 | Nesom | ................... | A01G 20/47 |
| 10,044,245 B2 * | 8/2018 | Bekavac | ............... | H02K 7/145 |
| 2009/0313785 A1 * | 12/2009 | Pedrazzini Bertolazzi | ................ | A47L 5/14 15/412 |
| 2012/0076672 A1 * | 3/2012 | Binder | ................. | F04D 25/084 417/234 |
| 2013/0239361 A1 * | 9/2013 | Pellenc | ................. | A01G 20/47 15/405 |

FOREIGN PATENT DOCUMENTS

| | | | | |
|---|---|---|---|---|
| CN | 202078261 U | 12/2011 | | |
| CN | 103154375 A | 6/2013 | | |
| CN | 103321171 A | 9/2013 | | |
| CN | 103866725 A | 6/2014 | | |
| CN | 104250958 A | * 12/2014 | ............... | A47L 5/24 |
| CN | 204626304 U | 9/2015 | | |
| JP | 2004092161 A | 3/2004 | | |
| JP | 2011111793 A | 6/2011 | | |

OTHER PUBLICATIONS

European Search Report and Written Opinion from European Application No. 15863288.5, dated Nov. 12, 2018, 8 pages.
International Search Report from International Application No. PCT/CN2015/095513, dated Mar. 4, 2016, 7 pages with English translation.
International Written Opinion from International Application No. PCT/CN2015/095513, dated Mar. 4, 2016, 4 pages.

* cited by examiner

BLOWER/VACUUM APPARATUS

CROSS-REFERENCE TO RELATED APPLICATIONS

This application is a national phase entry under 35 U.S.C. § 371 of International Patent Application PCT/CN2015/095513, filed Nov. 25, 2015, designating the United States of America and published as International Patent Publication WO 2016/082759 A1 on Jun. 2, 2016, which claims the benefit under Article 8 of the Patent Cooperation Treaty to Chinese Patent Application Serial No. 201410708685.5, filed Nov. 28, 2014.

TECHNICAL FIELD

The present invention relates to an electric tool, and in particular, to a blowing-suction device.

BACKGROUND

A blowing-suction device is a common outdoor cleaning tool, mainly for cleaning and collecting garbage such as leaves. To improve user's convenience of use, the blowing-suction device generally has blowing and suction functions. Faced with the situation that leaves scatters on the ground, a user can concentrate the scattering leaves by using the blowing function of the blowing-suction device. By use of the suction function of the blowing-suction device, the concentrated leaves are suctioned into a collection device to facilitate treatment. The collection device may be a garbage bag, a garbage can and the like. Such a leaf collection and treatment manner saves more manpower than the traditional manual cleaning, and has higher work efficiency.

Currently, the blowing-suction device on the market includes a main body into which a motor and a fan are mounted, and the motor drives the fan to rotate to generate airflow. However, as the fan in the main body should combine the use of blowing and suction, a centrifugal fan is employed. Due to the limitation of the structure of the centrifugal fan, the amount of air blown out by the blowing-suction device is often not big enough, the air-out efficiency and effect are not ideal, and users' demand cannot be met. In a blowing device using an axial fan, although the amount of air blown out meets the users' demand, the axial fan can only blow air but cannot perform a suction function, and cannot meet the users' demand.

Therefore, it is necessary to improve the existing technical means.

BRIEF SUMMARY

In view of this, one objective of the present invention is to provide a blowing-suction device that can combine execution of blowing and suction functions and have ideal blowing and suction effects.

To achieve the objective, the present invention employs a technical solution: a blowing-suction device, selectively operating in a blowing mode or a suction mode, comprising: a main body; a motor located inside the main body, having a motor shaft providing rotational motion; a fan assembly driven by the motor to rotate; and a blowing assembly and a suction assembly connected to the main body; wherein the fan assembly comprises an axial fan, in the blowing mode, the blowing assembly is connected to the main body, and the axial fan rotates around a first rotary shaft, and in the suction mode, the suction assembly is connected to the main body.

Preferably, the fan assembly further comprises a centrifugal fan, and the in the suction mode, the centrifugal fan rotates around a second rotary shaft.

Preferably, the suction assembly comprises a suction pipe, the blowing-suction device further comprises an outlet portion in communication with the suction pipe, and after the suction pipe is mounted to the main body, airflow generated by the centrifugal fan enters from the suction pipe and is discharged from the outlet pipe.

Preferably, the outlet pipe is fixed with the suction pipe, and the outlet pipe extends along a radial direction of the second rotary shaft.

Preferably, the outlet pipe is fixed onto the main body.

Preferably, the axial fan is fixed into the blowing assembly.

Preferably, the centrifugal fan is fixed into the suction assembly.

Preferably, the blowing-suction device further comprises a fixing device through which the blowing assembly and the suction assembly alternatively fit in with the main body.

Preferably, the blowing-suction device further comprises a coupler which alternatively power-connects the first rotary shaft and the second rotary shaft with the motor shaft.

Preferably, the coupler is a spline coupler.

Preferably, a first opening is disposed on the main body, and the blowing assembly and the suction assembly are fixedly connected to the first opening through the fixing device respectively, such that the first rotary shaft and the second rotary shaft connect the motor shaft through the coupler.

Preferably, a first opening and a second opening are disposed on the main body, the blowing assembly can connect the first opening, such that the first rotary shaft connects the motor shaft through the coupler; and the suction assembly can connect the second opening, such that the second rotary shaft connects the motor shaft through the coupler.

Preferably, the centrifugal fan is fixed into the suction assembly, and the axial fan is fixed into the main body.

Preferably, the axial fan and the centrifugal fan are both disposed in the main body.

Preferably, the axial fan and the centrifugal fan are located on two sides of the motor respectively along an extending direction of the motor shaft.

Preferably, wherein the axial fan and the centrifugal fan are located on the same side of the motor along an extending direction of the motor shaft.

Preferably, the blowing-suction device further comprises a clutch device disposed between the motor and the fan assembly, the clutch device comprises a clutch and an operating mechanism for operating the clutch, and the operating mechanism operably drives the clutch to make one of the axial fan and the centrifugal fan connect the motor, and at the same time, make the other one of the axial fan and the centrifugal fan disconnected from the motor.

Preferably, the clutch comprises a first spline located on the first rotary shaft, a second spline located on the second rotary shaft, and a spline sleeve selectively connected to one of the first spline and the second spline.

Preferably, the clutch comprises a first clutch located between the first rotary shaft and the motor shaft and a second clutch located between the second rotary shaft and the motor shaft.

Preferably, the first clutch comprises a first clutch member located in one of the first rotary shaft and the motor shaft and a second clutch member located in the other one of the first rotary shaft and the motor shaft, and the first clutch member and the second clutch member are selectively mutually engaged or disengaged.

Preferably, the blowing-suction device further comprises an abutting member through which the blowing assembly and the suction assembly trigger the operating mechanism to move when mounted to the main body.

Preferably, the blowing-suction device further comprises a clutch device located between the motor and the fan assembly, and when the motor is operated for forward or reverse rotation, the clutch device makes one of the axial fan and the centrifugal fan connect the motor, and at the same time, make the other one of the axial fan and the centrifugal fan disconnected from the motor.

Preferably, the clutch device comprises a first torsional spring located between the first rotary shaft and the motor shaft and a second torsional spring located between the second rotary shaft and the motor shaft, and the first torsional spring and the second torsional spring have opposite screw directions.

Preferably, the fan assembly further comprises a centrifugal fan rotating around a second rotary shaft, and in the suction mode, the axial fan is received in the centrifugal fan, to be combined into a mixed-flow fan to rotate.

To achieve the objective, the present invention employs a technical solution: a blowing assembly, connected to a blowing-suction device, the blowing-suction device comprising a main body and a motor received in the main body, wherein the blowing assembly comprises a blowing pipe, a rotary shaft located in the blowing pipe, and an axial fan supported at the rotary shaft, and when the blowing assembly connects the blowing-suction device, the axial fan can be driven by the motor to rotate.

To achieve the objective, the present invention employs a technical solution: a suction assembly, connected to a blowing-suction device, the blowing-suction device comprising a main body and a motor received in the main body, wherein the suction assembly comprises a suction pipe, a rotary shaft located in the suction pipe, and a centrifugal fan supported at the rotary shaft, and when the suction assembly connects the blowing-suction device, the centrifugal fan can be driven by the motor to rotate.

To achieve the objective, the present invention employs a technical solution: a blowing-suction device, selectively performing a blowing or suction operation, the blowing-suction device comprising: a main body; a motor located in the main body, having a motor shaft providing rotational motion; a fan assembly driven by the motor to make rotational motion; and a blowing assembly detachably connecting the main body; wherein the fan assembly comprises an axial fan, the blowing assembly is connected to the main body, and the axial fan can be driven by the motor shaft to rotate around a first rotary shaft, and generates airflow blown out from the blowing assembly.

To achieve the objective, the present invention employs a technical solution: a blowing-suction device, comprising: a main body; a motor located in the main body, having a motor shaft providing rotational motion; a fan assembly driven by the motor to make rotational motion; and a blowing-suction assembly detachably connecting the main body; wherein the fan assembly comprises an axial fan and a centrifugal fan, the axial fan rotates around a first rotary shaft to generate airflow blown out from the blowing-suction assembly, and the centrifugal fan rotates around a second rotary shaft to generate airflow suctioned from the blowing-suction assembly.

To achieve the objective, the present invention employs a technical solution: a blowing-suction device, selectively operating in a blowing mode or a suction mode, the blowing-suction device comprising: a main body; a motor located in the main body, having a motor shaft providing rotational motion; a fan assembly driven by the motor to make rotational motion; and an air pipe connecting the main body, wherein the fan assembly comprises an axial fan and a centrifugal fan, in the blowing mode, the axial fan rotations to generate airflow blown out from the air pipe, and in the suction mode, the centrifugal fan rotates to generate airflow suctioned from the air pipe.

To achieve the objective, the present invention employs a technical solution: a blowing-suction device, comprising: a main body; and a motor located in the main body, having a motor shaft providing rotational motion; wherein the blowing-suction device further comprises a blowing assembly and a suction assembly detachably alternatively connecting the main body; the blowing assembly comprises a blowing pipe and an axial fan received in the blowing pipe, and the suction assembly comprises a suction pipe and a centrifugal fan received in the suction pipe.

To achieve the objective, the present invention employs a technical solution: a blowing-suction device, comprising: a main body; and a motor located in the main body, having a motor shaft; wherein the blowing-suction device further comprises a blowing-suction assembly detachably connecting the main body; the blowing-suction assembly comprises a blowing-suction pipe and an axial fan and a centrifugal fan received in the blowing-suction pipe, and the axial fan is moveable between a blowing position where the motor only drives the axial fan and a suction position where the motor simultaneously drives the axial fan and the centrifugal fan.

To achieve the objective, the present invention employs a technical solution: a blowing-suction device, comprising: a main body; a motor located in the main body; and a centrifugal fan driven by the motor; wherein the blowing-suction device further comprises an axial fan driven by the motor and an operating mechanism, and the operating mechanism operably drives the axial fan and the centrifugal fan to be alternatively connected to the motor, thus being driven by the motor to rotate to generate airflow.

To achieve the objective, the present invention employs a technical solution: a blowing-suction device, comprising: a main body; a motor located in the main body; a fan assembly driven by the motor; and a blowing assembly and a suction assembly connected to the main body; wherein the fan assembly comprises an axial fan, the blowing assembly is connected to the main body, the blowing-suction device is in a suction mode, and the axial fan can rotate to generate airflow.

Preferably, the fan assembly further comprises a centrifugal fan, and when the suction assembly is connected to the main body, the blowing-suction device is in a blowing mode, and the centrifugal fan can rotate to generate airflow.

Compared with the prior art, beneficial effects of the present invention are as follows: the blowing-suction device selectively performs a blowing function or a suction function, when the blowing-suction device performs the blowing function, airflow generated by the axial fan has a greater amount of air to rapidly blow away leaves, and the blowing effect is ideal, and when the blowing-suction device performs the suction function, airflow generated by the centrifugal fan or the mixed-flow fan has a greater amount of air, which can remove weights, and the suction effect is ideal.

BRIEF DESCRIPTION OF THE DRAWINGS

The objective, technical solutions and beneficial effects of the present invention can be clearly obtained through the following detailed description about specific embodiments that can implement the present invention and with reference to the description about the accompanying drawings.

Like symbols and signs in the drawings and the specification are used for representing like or equivalent elements.

DETAILED DESCRIPTION

Preferred embodiments of the present invention are described below in detail with reference to the accompanying drawings, to enable the advantages and features of the present invention to be understood by those skilled in the art more easily, thus more clearly and definitely defining the protection scope of the present invention.

Figure 1:
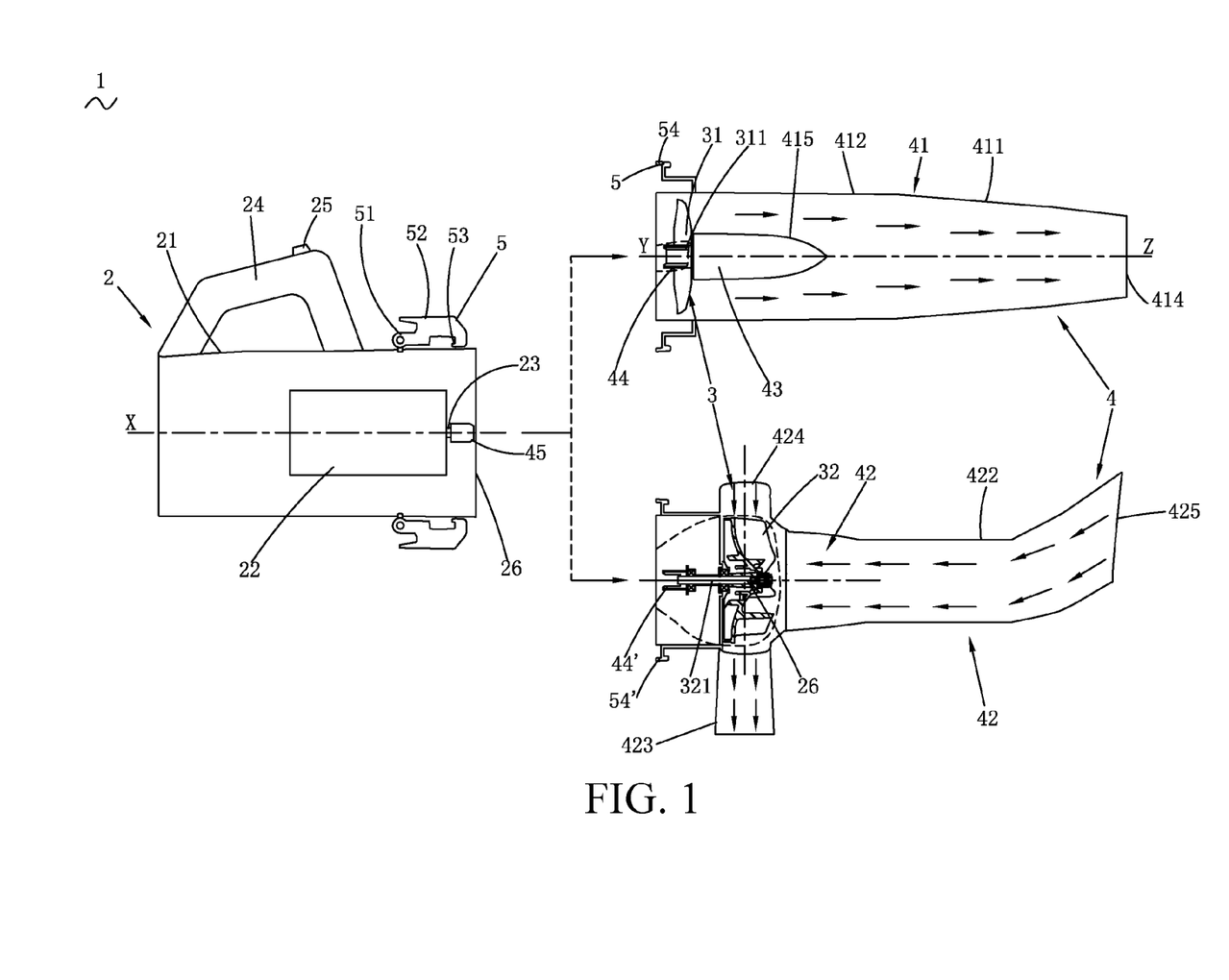
FIG. 1 is a partial sectional view of a blowing-suction device according to a first embodiment of the present invention.

FIG. 1 shows a blowing-suction device 1 according to a first embodiment of the present invention. The blowing-suction device 1 mainly includes a main body 2 and a blowing-suction assembly 4 connecting the main body 2. The main body 2 has a housing 21, a motor 22 is received in the housing 21 of the main body 2, and the motor 22 is used for generating power. The motor 22 has a motor shaft 23 extending along an axial direction. The motor shaft 23 can make rotational motion around an axis X. The blowing-suction device 1 further includes a fan assembly 3. The fan assembly 3 is driven by the motor shaft 23 to make rotational motion, and drives the air near the fan assembly 3 to flow towards a predetermined direction, thus forming airflow. The main body 2 further includes a handle 24 providing a holding function, and the handle 24 is disposed on the housing 21 of the main body 2. The blowing-suction device 1 further includes a control switch 25. The control switch 25 can control opening and closing of the motor 22. The control switch 25 is preferably disposed on the handle 24. The main body 2 is further provided with a power source. The power source is used for providing power for the motor 22. The power source may be a battery pack or a power line connecting an external power source or the like. The battery pack may be removable, and can be charged and discharged repeatedly. The voltage of the battery pack may be 20 V, 40 V, 56 V or the like.

Figures 4, 5:
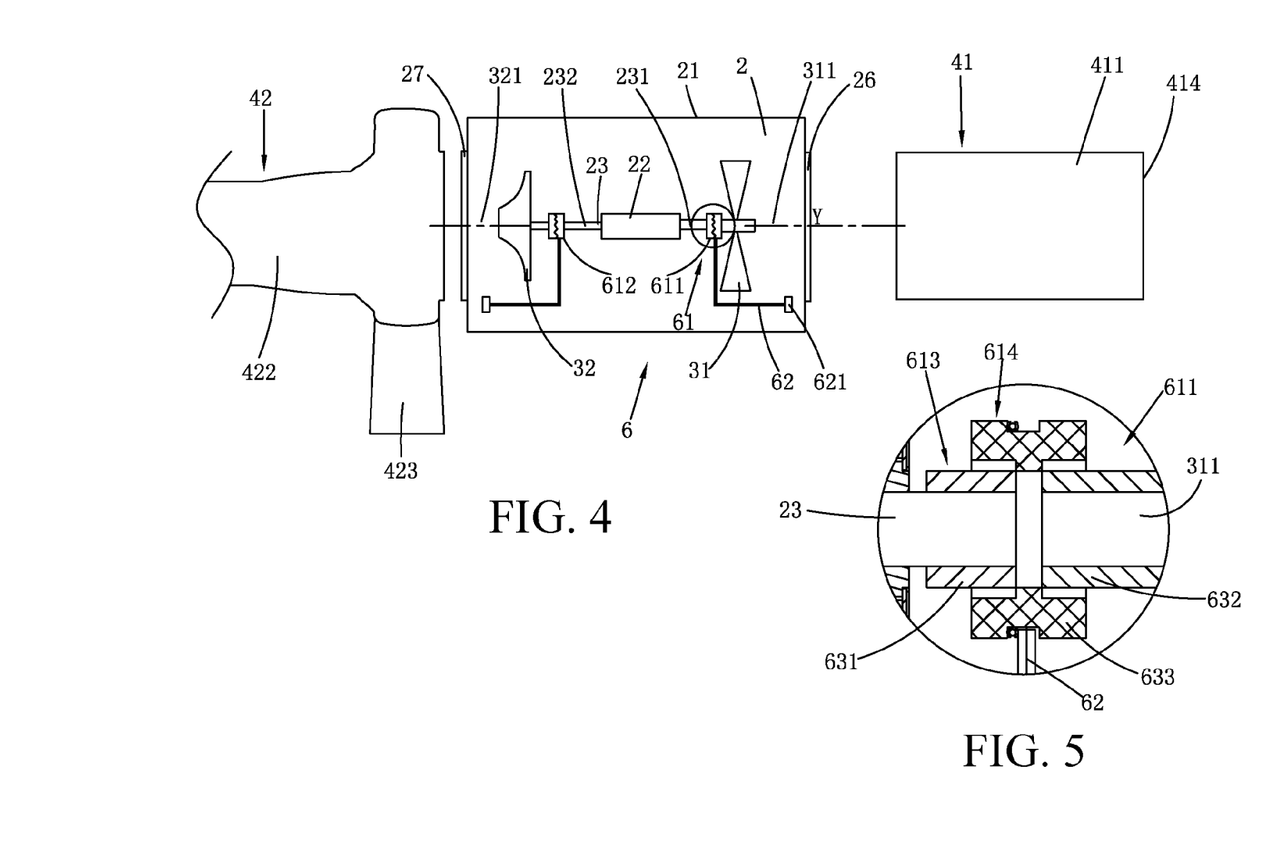
FIG. 4 is a schematic diagram of a blowing-suction device according to a second embodiment of the present invention.
FIG. 5 is a schematic partially enlarged diagram of the blowing-suction device in FIG. 4.
Figure 8:
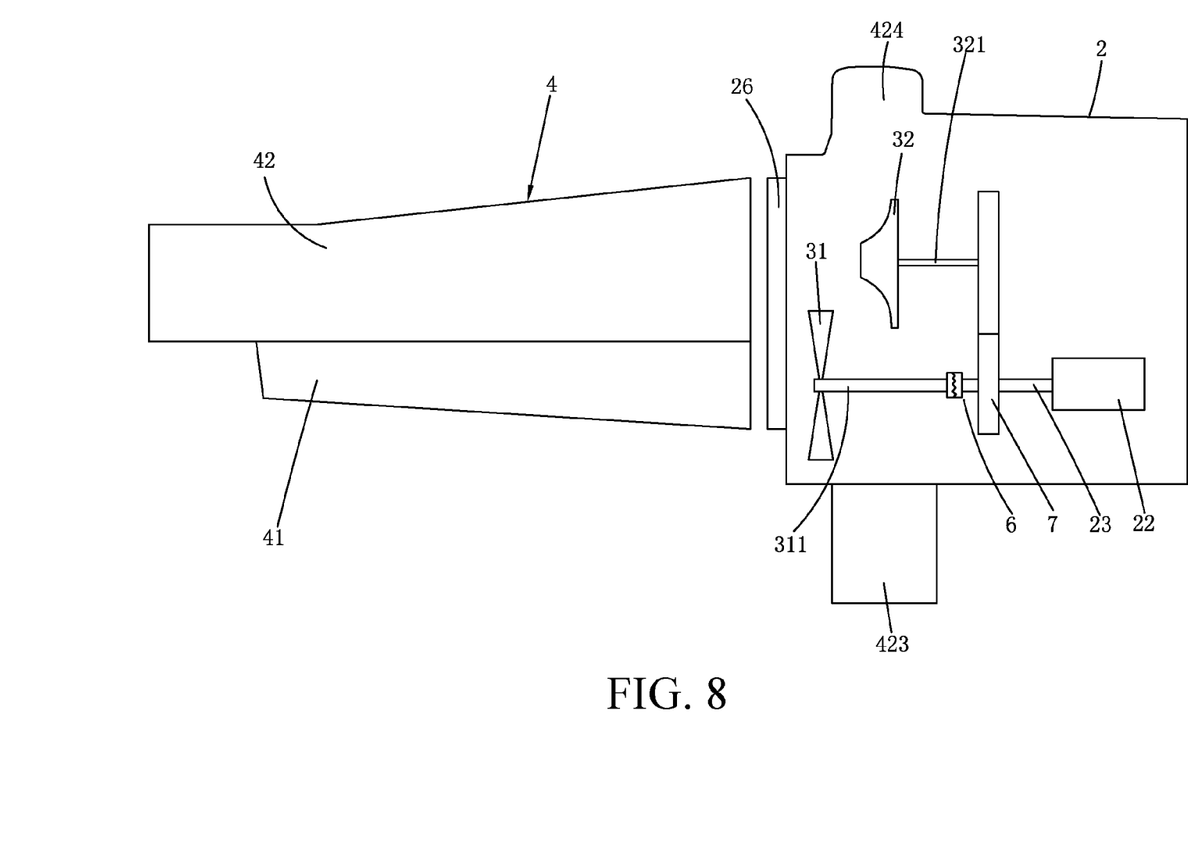
FIG. 8 is a schematic diagram of a blowing-suction device according to a fourth embodiment of the present invention.

The fan assembly 3 generally includes a spindle extending along an axial direction and blades making rotational motion around an axis of the spindle. The blades are arranged on the spindle along a circumferential direction, and extend substantially along a radial direction of the spindle. A transmission mechanism 7 (as shown in FIG. 8) for transferring power is further disposed between the motor 22 and the fan assembly 3. The transmission mechanism 7 mainly plays a role of reducing the speed. The transmission mechanism 7 is respectively connected to the motor shaft 23 and the spindle of the fan assembly 3, so as to transfer the rotational motion of the motor shaft 23 to the spindle of the fan assembly 3, causing the spindle of the fan assembly 3 also to make rotational motion. The transmission mechanism may be a common planetary gear train, gear set or worm and gear or the like. In other embodiments, the fan assembly 3 may also be directly connected to the motor shaft 23 not through the transmission mechanism. The fan assembly 3 may be, as shown in FIG. 1, disposed in the blowing-suction assembly 4, and may also be, as shown in FIG. 4, disposed in the main body 2. In this embodiment, the fan assembly 3 includes a first fan 31 and a second fan 32. The first fan 31 and the second fan 32 are disposed separately. Specifically, the first fan 31 is an axial fan, and the second fan 32 is a centrifugal fan. The first fan 31 rotates around a first rotary shaft 311, and including blades rotating around the first rotary shaft 311. After the first fan 31 rotates, a continuous low-pressure zone is generated on one side of the first fan 31, and outside air is constantly supplemented into the low-pressure zone. Then, a high-pressure zone is formed on the other side of the first fan 31, and the air in the high-pressure zone flows toward the outside with normal atmospheric pressure. The flowing direction of the airflow is flowing through the first fan 31 along a rotary shaft direction of the first rotary shaft 311, and then continuously flowing along an axial direction of the first rotary shaft 311. The airflow has characteristics of having a greater amount of air generated while having an ordinary wind pressure.

The second fan 32 rotates around a second rotary shaft 321, and includes blades rotating around the second rotary shaft 321. The second fan 32 forms a low-pressure zone near the second rotary shaft 321. The outside air enters the low-pressure zone, and then with the centrifugal force generated when the second rotary shaft 321 rotates, the air is thrown away along a tangential direction of the second rotary shaft 321. The flowing direction of the airflow is flowing through the second fan 32 along a rotary shaft direction of the second rotary shaft 321, and then flowing along a tangential direction of the second rotary shaft 321. The airflow has characteristics of having a greater wind pressure while having an ordinary amount of air. By using different characteristics of the axial fan and the centrifugal fan, the defects caused by poor work efficiency of the ordinary blowing-suction device in different modes can be made up. Certainly, in different embodiments, the first fan 31 may be composed of one axial fan, and may also be combined by multiple axial fans. The second fan 32 may also be composed of one or more centrifugal fans.

The blowing-suction assembly 4 plays a role of guiding airflow generated by the fan assembly 3. The blowing-suction assembly 4 is detachably connected to the main body 2. The blowing-suction assembly 4 includes a blowing assembly 41 for producing a blowing effect and a suction assembly 42 for producing a suction effect. The blowing assembly 41 is used for cooperating with the first fan 31, and the suction assembly 42 is used for cooperating with the second fan 32. The blowing assembly 41 and the suction assembly 42 can be disposed separately, and the blowing assembly 41 and the suction assembly 42 can also be fixedly connected or integrally formed, making the entire blowing-suction assembly 4 serve as a whole.

Figure 2:
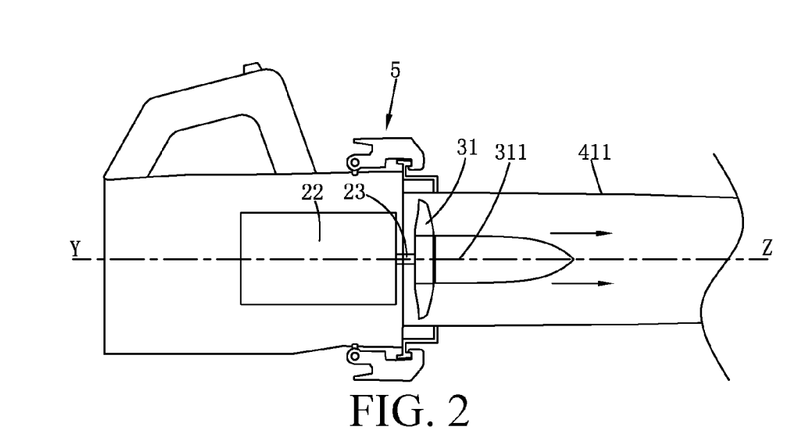
FIG. 2 is a schematic diagram showing that the blowing-suction device in FIG. 1 is in a blowing mode.

The blowing-suction device 1 has two operating modes, that is, a blowing mode in which a blowing function is performed and a suction mode in which a suction function is performed. A user can select the blowing mode or the suction mode according to requirements of actual work. In the blowing mode, the blowing assembly 41 is mounted onto the main body 2. In this embodiment, the blowing assembly 41 includes a blowing pipe 411 extending straightly, one end of the blowing pipe 411 is detachably mounted onto the main body 2, and the other end forms an air outlet blowing port 414 in communication with the outside. The blowing pipe 411 has a pipe wall 412, and the blowing pipe 411 is encircled by the pipe wall 412 to form an airflow channel. In this embodiment, a duct 415 is further preferably disposed in the blowing pipe 411. The duct 415 plays a role of enhancing the airflow effect. In other embodiments, the duct 415 may also be disposed on the main body 2. Certainly, the blowing-suction device 1 may not be provided with the duct 415. As shown in FIG. 2 and FIG. 4, the blowing pipe 411 is connected onto the main body 2, the direction of the axis Y of the first rotary shaft 311 of the first fan 31 of the fan assembly 3 is defined as a first direction, and an extending direction of the blowing pipe 411 is also the first direction. That is to say, the direction of the axis Y of the first rotary shaft 311 of the first fan 31 is consistent with the extending direction of the blowing pipe 411. Further, the axis Y of the first rotary shaft 311 coincides with the centerline Z of the blowing pipe 411. The main body 2 and the blowing assembly 31 mounted onto the main body 2 form a first airflow channel. Specifically, the main body 2 is provided with an air inlet, the air enters the interior of the main body 2 from the air inlet and forms, via the first fan 31, airflow moving along the axial direction of the first rotary shaft 311, and the airflow is blown out from the blowing pipe 411.

Figure 3:
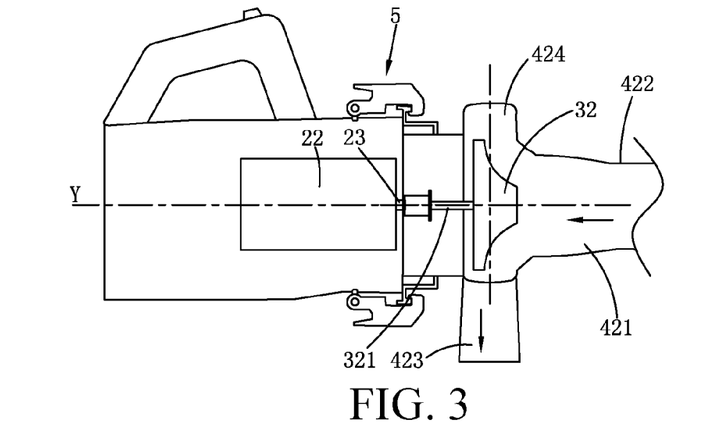
FIG. 3 is a schematic diagram showing that the blowing-suction device in FIG. 1 is in a suction mode.

In the suction mode, the suction assembly 42 is mounted onto the main body 2. As shown in FIG. 1 and FIG. 3, the suction assembly 42 includes a suction pipe 422. The suction pipe 422 substantially extends longitudinally. In this embodiment, the suction pipe 422 may not be disposed straightly, but has a bending portion. Certainly, in other embodiments, the suction pipe 422 may also be designed into a cylinder shape. The suction pipe 422 has a suction port 425, and the outside air, along with the garbage, enters the suction pipe 422 from the suction port 425. The blowing-suction device 1 further includes an outlet pipe 423 in communication with the suction pipe 422. The suction pipe 422 is disposed substantially perpendicular to the outlet pipe 423. The outlet pipe 423 may be connected to a collection device for collecting garbage. The collection device may be a garbage can, may also be a garbage bag easy to carry, or the like. In the suction mode, leaves, dust and other garbage are suctioned from the suction port 425 of the suction pipe along with the air, and then are discharged to the collection device after passing through the outlet pipe 423. The air can naturally escape from the collection device, while the garbage is collected in the collection device. The suction pipe 422 and the outlet pipe 423 make up a second airflow channel in the suction mode. The outlet pipe 423 may be directly fixed to the suction pipe 422, and may also be disposed on the main body 2. In a preferred embodiment, the outlet pipe 423 further includes a helical channel 424. The helical channel 424 has a radius distance gradually varying to the center. The suction pipe 422 is connected to the center of the helical channel 424, so that the air enters from the suction pipe 422 into the center of the helical channel 424, that is, the starting part of the helical channel 424. Then, the air moves along the helical channel 424, until it is discharged from the tail end of the helical channel 424 and enters the part of the outlet pipe 423 connecting the collection device. The second fan 32 may be disposed in the helical channel 424. As shown in FIG. 3, the suction assembly 42 is connected onto the main body 2, and the suction pipe 422 extends along the axial direction of the second rotary shaft 321. That is, the second rotary shaft 321 is aligned with the suction pipe 422. However, as the blowing pipe 422 partially bends or there is an error, the suction pipe 422 may not strictly extend along the axial direction of the second rotary shaft 321, but there may be an error of an angle. However, it can be understood that the suction pipe 422 substantially extends along the circumferential direction of the second rotary shaft 321. As the outlet pipe 423 is basically perpendicular to the suction pipe 422, the outlet pipe 423 is aligned with a rotary tangential direction of the second rotary shaft 321. The outside air enters the suction pipe 422 from the suction port 425, is driven by the second fan 32 to move along the helical channel 424, and finally flows out from the outlet pipe 423 disposed in the tangential direction.

FIG. 1 to FIG. 3 show a first embodiment of the present invention. In this embodiment, the first fan 31 and the second fan 32 are disposed in the blowing-suction assembly 4. Specifically, the first fan 31 as an axial fan is disposed in the blowing-suction assembly 4. The outlet pipe 423 and the suction pipe 422 are integrally formed, and the outlet pipe 423 is further connected with the helical channel 424. The second fan 32 as a centrifugal fan is disposed in the blowing-suction assembly 4. More specifically, the second fan 32 is disposed in the helical channel 424. The blowing assembly 41 and the suction assembly 42 are disposed separately, and are respectively connected to the main body 2 as two separate components. The main body 2 is provided with a motor 22, one end of the housing 21 of the main body 2 along an extending direction of a motor shaft 23 is closed, and a grille for providing air circulation may also be disposed. The other end of the housing 21 is provided with a first opening 26. The blowing assembly 41 and the suction assembly 42 are both detachably connected onto the main body 2 by the first opening 26.

The blowing-suction device 1 further includes a fixing device 5 disposed on the blowing-suction assembly 4 and the main body 2. As shown in FIG. 1, the fixing device 5 includes a biasing member 52 located on the main body 2 and biased by a spring 51. The biasing member 52 is provided with a hook 53. The fixing device 5 further includes a boss 54 disposed on the blowing pipe 411, and also includes a boss 54' disposed on the suction pipe 422. The size and shape of the boss 54' are consistent with those of the boss 54 disposed on the blowing pipe 411. As the fixing structure disposed on the blowing pipe 411 is basically the same as that disposed on the suction pipe 422, the boss 54 disposed on the blowing pipe 411 is taken as an example for illustration. When the blowing pipe 411 is connected to the main body 2, the boss 54 fits in with the hook 53 to achieve fixed connection, as shown in FIG. 2 and FIG. 3. Certainly, in other embodiments, the biasing member 52 may also be disposed on the blowing pipe 411, and the boss 54 is disposed on the main body 2. The specific structure of the fixing device 5 may also employ another fixing manner, for example, screw-thread fit fixing, fixing achieved by matching of an elastic member with a slot, fixing achieved by rotational abutment of a cam, or other manners. As shown in FIG. 1 to FIG. 3, the first fan 31 is located in the blowing pipe 411, and is located on one end away from the air outlet blowing port 414. The second fan 32 is located in the helical channel 424. When the blowing pipe 411 is mounted onto the main body 2, the first fan 31 in the blowing pipe 411 is power-connected to the motor shaft 23 located in the main body 2. When the suction assembly 42 including the helical channel 424 is mounted onto the main body 2, the second fan 32 is power-connected to the motor shaft 23 located in the main body 2. The blowing-suction device 1 further includes a safe linkage mechanism that is used for selectively locking a control switch 25 controlling the motor. Specifically, when the blowing pipe 411 or the suction pipe 422 is not correctly connected to the main body 2, the safe linkage mechanism is in a state of locking the control switch 25. At this point, the user cannot operate the control switch 25 to start, and the motor 22 cannot work normally. Only when the blowing pipe 411 or the suction pipe 422 is correctly connected to the main body 2, can the safe linkage mechanism unlock the control switch 25. At this point, the user can operate the control switch 25 to start the motor 22 to work normally.

The blowing-suction device 1 of the present invention further includes a coupler for connecting the first rotary shaft 311 and the motor shaft 23 together. In this embodiment, the coupler includes a spline sleeve 44 disposed on the first rotary shaft 311 and a spline shaft 45 disposed on the motor shaft 23. When the blowing pipe 411 is clamped with the first opening 26 on the main body 2, the spline sleeve 44 on the first rotary shaft 311 just fits in with the spline shaft 45 on the motor shaft 23. When the motor 22 rotates, the motor shaft 23 drives the first rotary shaft 311 to rotate around its axis, and airflow generated by the first fan 31 is blown out from the blowing pipe 411. The coupler also includes a spline sleeve 44' disposed on the second rotary shaft 321 of the second fan 32 and a spline shaft 45 on the motor shaft 23. The size and shape of the spline sleeve 44' on the second rotary shaft 321 are the same as those of the spline sleeve 44 on the first rotary shaft 311.

The specific work condition of the blowing-suction device is as follows: when the blowing-suction device 1 is to be switched to the blowing mode, as shown in FIG. 2, the blowing pipe 411 is fixedly connected onto the main body 2 through the fixing device 5, and at the same time, the motor shaft 23 is just connected to the first rotary shaft 311 through the coupler. After the control switch 25 is operated to start the motor, the motor 22 drives the first fan 31 to rotate around the first rotary shaft 311, and the first fan 31 is an axial fan, which blows out, from the blowing assembly 4, airflow flowing along the axial direction. When the blowing-suction device 1 is to be switched to the suction mode, as shown in FIG. 3, it is necessary to first remove the blowing assembly 41 from the main body 2 and connect the suction assembly 42 onto the main body 2. Upon completion of connection, the motor shaft 23 is connected to the second rotary shaft 321 through the coupler. The motor 2 is started, the motor shaft 23 drives the second fan 32 to rotate around the second rotary shaft 321, and the air is suctioned from the suction pipe 422 along an extending direction of the second rotary shaft 321, and then is discharged from the outlet pipe 423.

FIG. 4 shows a second embodiment of the present invention. In this embodiment, the fan assembly 3 also includes a first fan 31 and a second fan 32. The blowing-suction assembly 4 also includes a blowing assembly 41 and a suction assembly 42 disposed separately. The difference lies in that the first fan 31 and the second fan 32 are disposed in the main body 2, instead of being disposed in the blowing-suction assembly 4. The motor shaft 23 has, along an axial direction, a first end 231 and a second end 232 opposite to each other. The first end 231 is fixedly connected to the first fan 31, and the second end 232 is fixedly connected to the second fan 32. Therefore, the motor 22 is disposed, along the axial direction of the motor shaft 23, between the first fan 31 and the second fan 32. The housing 21 of the main body 2 is further provided with a first opening 26 and a second opening 27 respectively. The shape of the first opening 26 matches the shape of the corresponding opening of the blowing assembly 41, and the blowing assembly 42 is connected onto the main body 2 through the first opening 26. The shape of the second opening 27 matches the shape of the corresponding opening of the suction assembly 42, and the suction assembly 43 is connected onto the main body 2 through the second opening 27.

To avoid that the first fan 31 and the second fan 32 interfere with each other, the blowing-suction device 1 is further provided with a clutch device 6 between the motor 22 and the fan assembly 3. The clutch device 6 includes a clutch 61 and an operating mechanism 62 for operating the clutch 61. The clutch 61 operably connects one of the first fan 31 and the second fan 32 with the motor 22. Specifically, when the blowing mode is performed, the clutch device 6 switches to an on state to power-connect the first fan 31 with the motor 22, while the second fan 32 power-disconnects the motor 22. At this point, the motor 22 only drives the first fan 31 to work but may not drive the second fan 32 to work. When the suction mode is performed, the clutch device 6 switches to an off state to power-connect the second fan 32 with the motor 22, while the first fan 31 power-disconnects the motor 22. At this point, the motor 22 only drives the second fan 32 to work but may not drive the first fan 31 to work. In this embodiment, the number of the clutch 61 is two. Specifically, the clutch 61 includes a first clutch 611 disposed between the motor 22 and the first fan 31 and a second clutch 612 disposed between the motor 22 and the second fan 32, and the operating mechanism 62 may also correspondingly operate the two clutches. The structures of the first clutch 611 and the second clutch 612 are similar, and the first clutch 611 is taken as an example here for illustration. As shown in FIG. 5, the first clutch 611 includes a first clutch member 613 and a second clutch member 614. The operating mechanism 62 controllably drives the first clutch member 613 and the second clutch member 614 to move relatively, thus achieving clutch. More specifically, the first clutch member 613 and the second clutch member 614 are on and off in the form of spline fit. The first clutch member 613 includes a first spline shaft 631 connecting the motor shaft 23, and the second clutch member 614 includes a second spline shaft 632 connecting the first rotary shaft 311 and a spline sleeve 633 in spline fit with the second spline shaft 632. The spline sleeve 633 is always in spline fit with the second spline shaft 632, and the operating mechanism 62 drives the spline sleeve 633 to move toward a direction, such that the first spline shaft 631 and the second spline shaft 632 are matched and connected. The operating mechanism 62 may further drive the spline sleeve 633 to move toward another direction, such that the spline sleeve 633 is disconnected from the first spline shaft 631, and the first spline shaft 631 and the second spline shaft 632 are disconnected correspondingly. Certainly, in other embodiments, the spline sleeve 633 may also be always in spline fit with the first spline shaft 631, while is selectively splined with or disconnected from the second spline shaft 632. In this embodiment, the operating mechanism 62 includes a push rod connecting the spline sleeve 633, and the user operates and moves the push rod to drive the spline sleeve 633 to move, thus achieving the on-off effect of the clutch 61. In a preferred embodiment, the blowing-suction device 1 further includes an abutting member 621 connecting the push rod, and the blowing-suction assembly 4 can contact the abutting member 621 and push it to move when mounted to the main body 2, such that the whole operating mechanism 62 drives the spline sleeve 633 to move and be on and off. In this way, the user's additional operations can be avoided, and the operating mechanism 62 can be triggered when the blowing-suction assembly 4 is mounted.

The specific work condition of the blowing-suction device in this embodiment is as follows: when it is to be switched to the blowing mode, the blowing assembly 41 is connected onto the main body 2, and the motor 22 drives the first fan 31 in the main body 2 to rotate. When it is to be switched to the suction mode, the blowing assembly 41 is removed and the suction assembly 42 is connected onto the main body 2, and the motor 22 drives the second fan 32 in the main body 2 to rotate. Switching between the blowing and suction modes is implemented by dismounting and mounting the blowing assembly 41 and the suction assembly 42.

Figures 6, 7:
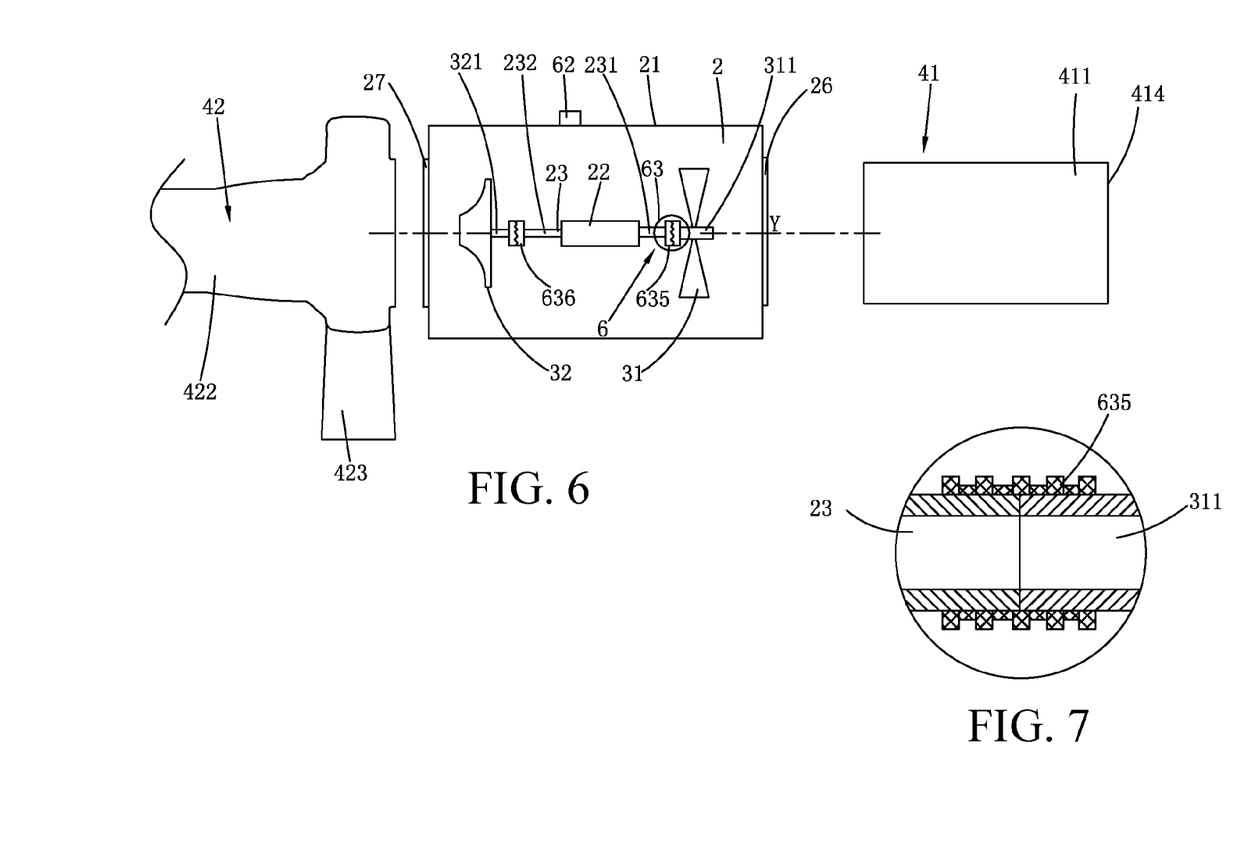
FIG. 6 is a schematic diagram of a blowing-suction device according to a third embodiment of the present invention.
FIG. 7 is a schematic partially enlarged diagram of the blowing-suction device in FIG. 6.

FIG. 6 shows a third embodiment of the present invention. Compared with the second embodiment, the first fan 31 and the second fan 32 in this embodiment are also disposed in the main body 2. The first fan 31 and the second fan 32 are also located on two sides of the motor 22 respectively. The blowing assembly 41 and the suction assembly 42 are separately mounted onto the main body 2 respectively. A clutch device 6 is also disposed between the first fan 31, the second fan 32 and the motor 22. The main difference is that the structure and principle of the clutch device 6 are different. The motor 22 is alternatively connected to one of the first fan 31 and the second fan 32 and disconnected from the other one of the first fan 31 and the second fan 32 not by using another control element or dismounting the blowing-suction assembly 4. Instead, connection and disconnection between the first fan 31, the second fan 32 and the motor 22 are implemented by controlling the rotating direction of the motor. In this embodiment, when the motor 22 is controlled to rotate forward, the motor 22 drives the first fan 31 to rotate, thus performing the blowing function. When the motor 22 is controlled to rotate reversely, the motor 22 drives the second fan 32 to rotate, thus performing the suction function. The clutch device 6 includes a first torsional spring 635 connecting the first rotary shaft 311 and the motor shaft 23 and a second torsional spring 636 connecting the second rotary shaft 321 and the motor shaft 23. As shown in FIG. 7, the first torsional spring 635 and the second torsional spring 636 are connected onto the motor shaft 23 by fixing respectively, and are in clearance fit with the first rotary shaft 311 and the second rotary shaft 321. In other words, the first torsional spring 635 and the second torsional spring 636 are selectively connected to or disconnected from the first rotary shaft 311 and the second rotary shaft 321. Besides, the first torsional spring 635 and the second torsional spring 636 have opposite screw directions. For example, the first torsional spring 635 has a clockwise screw direction, while the second torsional spring 636 has a counterclockwise screw direction. When the motor 23 rotates clockwise, as the screw direction of the first torsional spring 635 is also clockwise, the part of the first torsional spring 635 in clearance fit with the first rotary shaft 311 may tighten up to drive the first rotary shaft 311 to rotate, and as the screw direction of the second torsional spring 636 is opposite to the clockwise rotating direction of the motor, the part of the second torsional spring 636 in clearance fit with the second rotary shaft 321 may further loosen, making the motor 23 power-disconnected from the second rotary shaft 311, and the motor shaft 23 would not drive the second rotary shaft 321 to rotate. When the motor 23 rotates counterclockwise, the part of the second torsional spring 636 in clearance fit may tighten up to drive the second rotary shaft 321 to rotate, while the part of the first torsional spring 635 in clearance fit may further loosen, thus not driving the first rotary shaft 311 to rotate.

FIG. 8 shows a fourth embodiment of the present invention. In this embodiment, the fan assembly 3 includes a first fan 31 and a second fan 32, and the first fan 31 and the second fan 32 are both located in the main body 2. Compared with the second embodiment, the main difference is that the first fan 31 and the second fan 32 are located on a same side of the motor 22. Extending directions of the first rotary shaft 311 and the second rotary shaft 321 are parallel to the extending direction of the motor shaft 23, and the first fan 311 and the second fan 321 are connected to the motor shaft 23 through a transmission mechanism. The housing 21 of the main body 2 may have a first opening 26, but may not need a second opening. Moreover, the blowing-suction assembly 4 includes a blowing assembly 41 and a suction assembly 42 fixedly connected to each other. The blowing-suction assembly 4 is wholly connected onto the main body 2 through the first opening 26. The outlet pipe 423 may be disposed on the main body 2, and may also be disposed on the suction assembly 42, and the helical channel 424 may also be selectively disposed on the main body 2 or on the suction assembly 42.

The blowing-suction device 1 further includes a blowing-suction switching mechanism for mode switching. The blowing-suction switching mechanism may be linked with the clutch device 6. When the user controls it to switch to the blowing mode, the clutch device 6 correspondingly changes the on-off state with the switching change of the blowing-suction switching mechanism, so that the motor shaft 23 power-connects the first rotary shaft 311, while the motor shaft 23 power-disconnects the second rotary shaft 321. In this way, the motor 22 can drive the first fan 31 to work. When the user controls it to switch to the suction mode, the clutch device 6 may also change the on-off state correspondingly, so that the motor shaft 23 power-connects the second rotary shaft 321, while the motor shaft 23 power-disconnects the first rotary shaft 311. In this way, the motor 22 can drive the second fan 321 to work. Such design has an advantage as follows: during mode switching, it is unnecessary to repeatedly remove and mount the blowing assembly 41 and the suction assembly 42. The clutch device 6 includes a first spline shaft connecting the first rotary shaft 311, a second spline shaft connecting the second rotary shaft 321 and a spline sleeve connecting the motor shaft 23. The spline sleeve operably moves to cause the spline sleeve to be alternatively connected to the first spline shaft or the second spline shaft. Specifically, the spline sleeve is controlled to move along a direction, so that the spline sleeve is splined with the first spline shaft but disconnected from the second spline shaft. At this point, the motor shaft 23 can drive the first fan 31 to rotate around the first rotary shaft 311, and at this point, the second fan 321 does not work due to disconnection from the motor 22. The spline sleeve is controlled to move along an opposite direction, so that the spline sleeve is splined with the second spline shaft but disconnected from the first spline shaft. At this point, the motor shaft 23 can drive the second fan 321 to rotate around the second rotary shaft 321.

Figure 9:
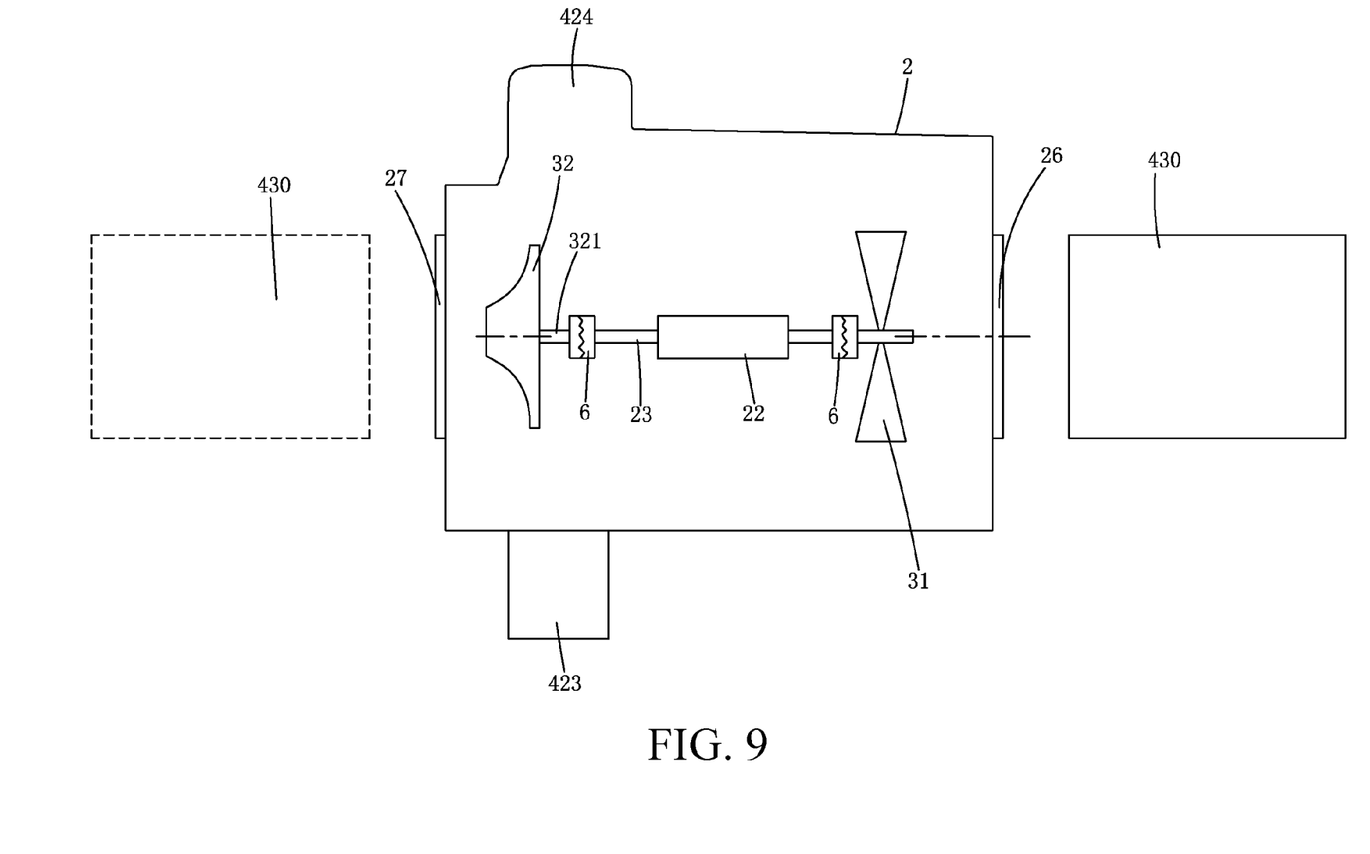
FIG. 9 is a schematic diagram of a blowing-suction device according to a fifth embodiment of the present invention.

FIG. 9 shows a fifth embodiment of the present invention. In this embodiment, the fan assembly 3 includes a first fan 31 and a second fan 32. The first fan 31 and the second fan 32 are both located in the main body 2. The motor 22 is located between the first fan 31 and the second fan 32, and are connected to the first fan 31 and the second fan 32 respectively. A clutch device 6 is disposed between the motor shaft 23 and the first fan 31, the second fan 32. The main body 2 is provided with a first opening 26 and a second opening 27. In this embodiment, the outlet pipe 423 and the helical channel 424 are both disposed on the main body 2, and are disposed near the second opening 27 of the main body 2. In a preferred embodiment, a same air pipe 430 can be used as a blowing pipe and a suction pipe. In a blowing mode, the air pipe 430 is mounted to the first opening 26, the motor 22 drives the first fan 31 to work, and airflow is blown out from the air pipe. When it switches to the suction mode, the air pipe 430 is removed from the first opening 26 and mounted to the second opening 27, the motor drives the second fan 32 to work, and the air is suctioned from the air pipe 430 and discharged from the outlet pipe 423 on the main body 2.

Figure 10:
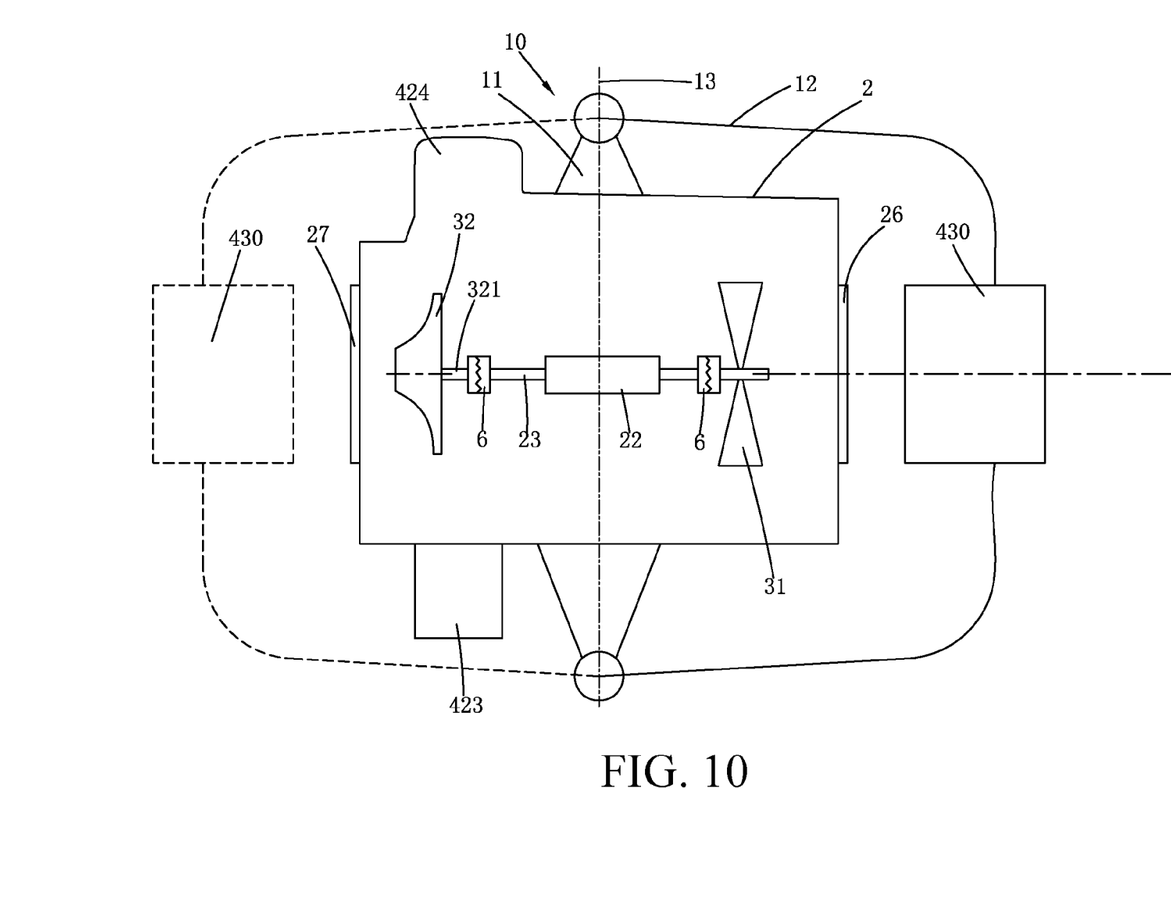
FIG. 10 is a schematic diagram of a blowing-suction device according to a sixth embodiment of the present invention.

FIG. 10 is a sixth embodiment of the present invention. In this embodiment, one air pipe 430 is still used as a blowing pipe or a suction pipe. Different from the fifth embodiment, the blowing-suction device 1 is provided with a pivot device 10 connecting the air pipe and the main body 2. The pivot device 10 can control the air pipe 430 to change the position relative to the main body 2. The pivot device 10 rotates around a pivot 13. The pivot device 10 further includes a first connecting arm 11 connecting the main body 2 and a second connecting arm 12 connecting the air pipe 430. As shown in FIG. 10, in the blowing mode, the air pipe moves to a position where it cooperates with the first fan 31. At this point, the air pipe 430 is used as a blowing pipe. When it switches to the suction mode, the air pipe does not need to be removed, the air pipe is moved, through the pivot device, to a position where it cooperates with the second fan 32. At this point, the air pipe 430 is used as a suction pipe.

Figure 11:
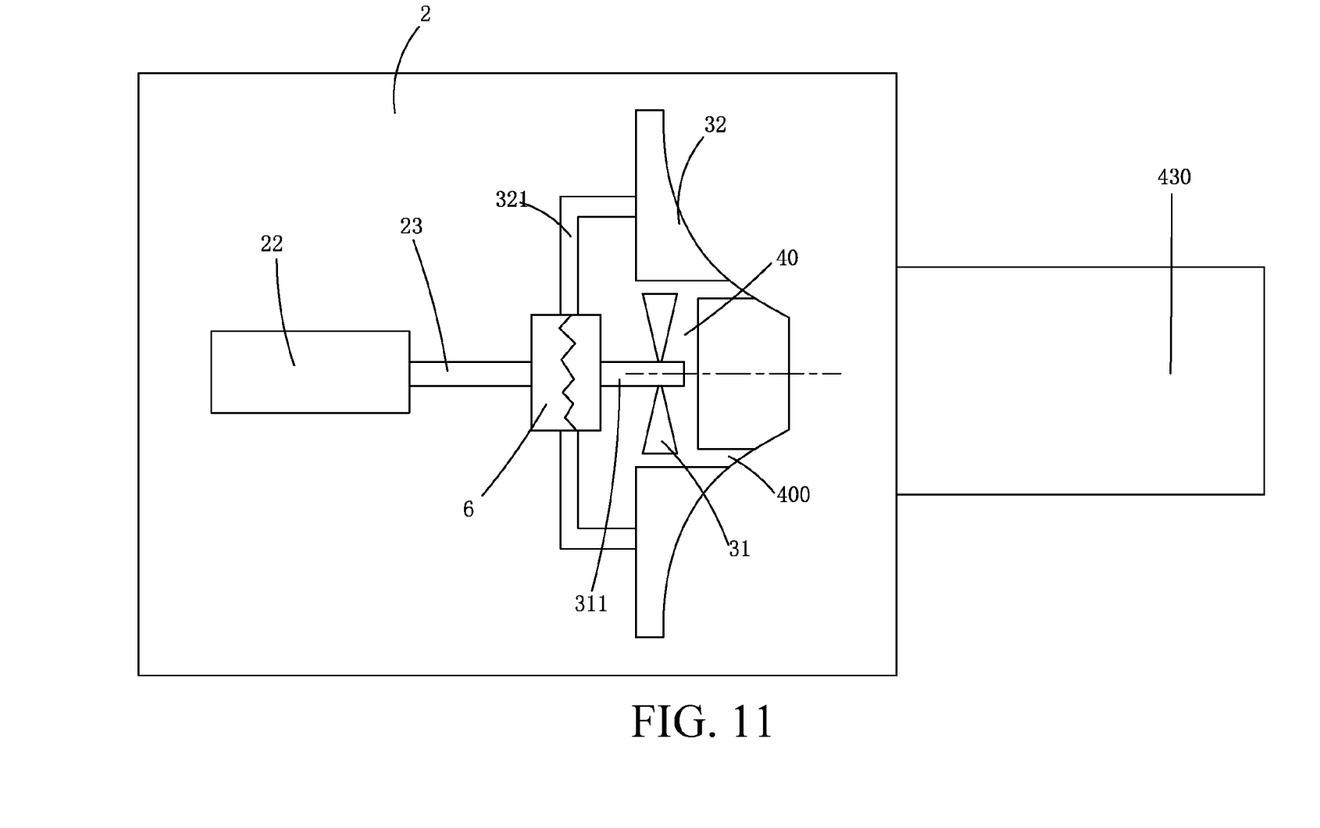
FIG. 11 is a schematic diagram of a blowing-suction device according to a seventh embodiment of the present invention.

FIG. 11 shows a seventh embodiment of the present invention. In this embodiment, one air pipe 430 is still used as a blowing pipe or a suction pipe, and the air pipe 430 does not need to move the position during switching of blowing and suction modes and can be always fixedly connected onto the main body 2. The main body 2 is provided with a first fan 31 and a second fan 32. The first fan 31 is an axial fan, and has axial blades and a first rotary shaft 311. The second fan 32 is a centrifugal fan, and has centrifugal blades and a second rotary shaft 321. The axial fan can move between a blowing position where the motor 22 only drives the axial fan to rotate and a suction position where the motor 22 simultaneously drives the axial fan and the centrifugal fan. The second fan 32 is provided with an accommodating chamber 40 that accommodates the first fan 31. The first fan 31 is located in the accommodating chamber 40. The second fan 32 is further provided with a channel 400 in communication with the accommodating chamber 40 and the air pipe 430. A clutch device is disposed between the first rotary shaft 311 of the first fan 31, the second rotary shaft 321 of the second fan 32 and the motor shaft 23. In the blowing mode, the motor shaft 23 of the motor 22, through the clutch device, power-connects the first rotary shaft 311 and power-disconnects the second rotary shaft 321, so that the motor 22 drives the first fan 31 to rotate. Airflow generated by the first fan 31 passes through the channel 41 of the second fan 32, and is blown to the outside from the air pipe 430. When it switches to the suction mode, the motor shaft 23, through the clutch device, power-connects the second rotary shaft 321 and power-disconnects the first rotary shaft 311. The motor 22 can drive the second fan 32 to rotate, so as to suction the airflow from the air pipe 430.

Figure 12:
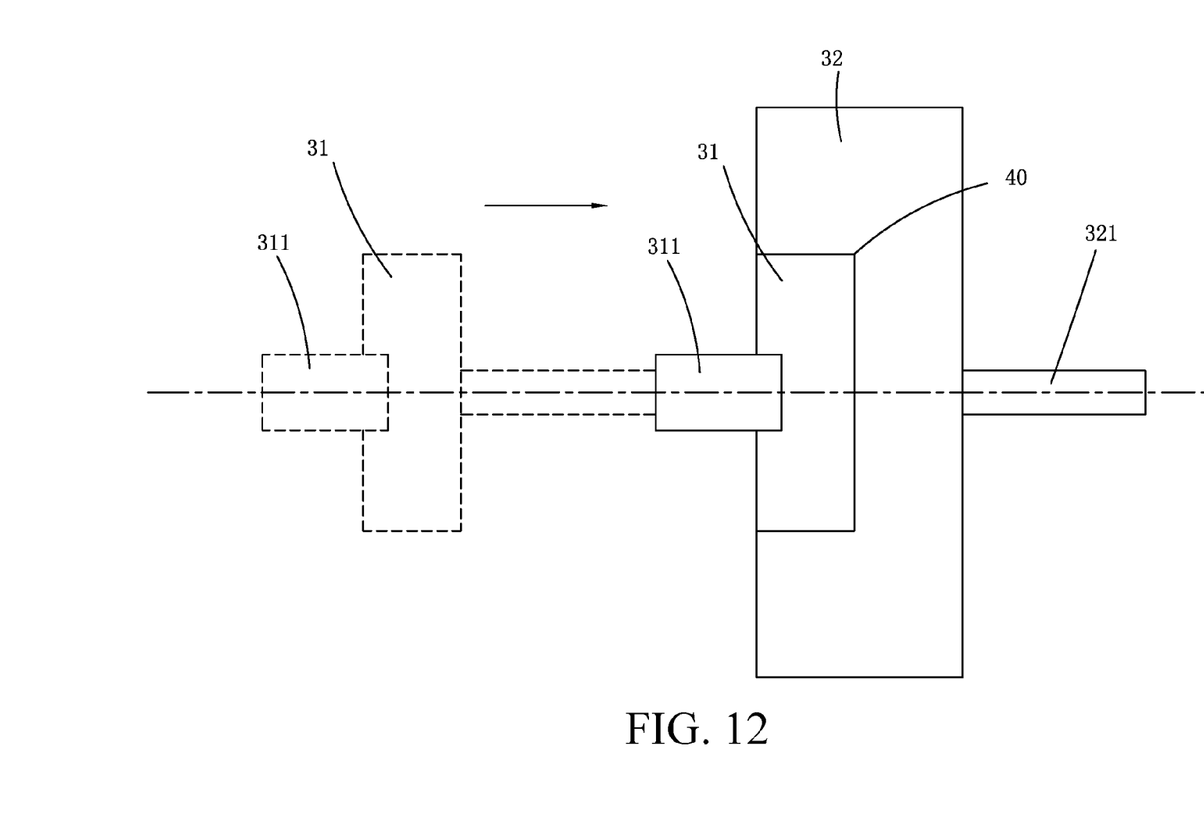
FIG. 12 is a schematic diagram of a blowing-suction device according to an eighth embodiment of the present invention.

FIG. 12 shows an eighth embodiment of the present invention. In this embodiment, the fan assembly 3 still includes a first fan 31 and a second fan 32. The first fan 31 is an axial fan, and the second fan 32 is a centrifugal fan. The first fan 31 moveably cooperates with the second fan 32. In the blowing mode, the first fan 31 as the axial fan works, and does not cooperate with the second fan 32. The second fan 32 as the centrifugal fan does not work. In the suction mode, the first fan 31 moves to the position where it cooperates with the second fan 32, so that the first fan 31 and the second fan 32 work together. As shown in FIG. 12, the second fan 32 has an accommodating chamber 40, and the first fan 31 can move along an axial direction of the first rotary shaft 311. When the first fan 31 is received in the accommodating chamber 40 of the second fan 32, the blades of the first fan 31 are aligned with the blades of the second fan 32, to make up mixed-flow blades. In the blowing mode, the first fan 31 works alone and generates airflow, but the second fan 32 does not work. In the suction mode, the blades of the first fan 31 and the blades of the second fan 32 are combined into blades of a mixed-flow fan, such that the first fan 31 and the second fan 32 wholly make up a mixed-flow fan. The motor 22 drives the first fan 31 and the second fan 32 to work together, causing the mixed-flow fan to rotate and generate airflow.

The above embodiments merely express several implementations of the present invention, and are described specifically and in detail, but cannot be thus understood as limitations to the patent scope of the present invention. It should be indicated that those of ordinary skill in the art can also make transformations and improvements without departing from the concept of the present invention, all of which belong to the protection scope of the present invention.

What is claimed is:

1. A blowing-suction device, selectively operating in a blowing mode or a suction mode, comprising: a main body; a motor located inside the main body, having a motor shaft providing rotational motion; a fan assembly located in the main body driven by the motor to rotate; and a blowing assembly and a suction assembly connected to the main body; wherein: the blowing assembly and the suction assembly are disposed separately, and are respectively connected to the main body as two separate components, the fan assembly comprises an axial fan, in the blowing mode the blowing assembly is connected to the main body, the suction assembly is separated from the main body, and the axial fan rotates around a first rotary shaft, and in the suction mode the suction assembly is connected to the main body and the blowing assembly is separated from the main body; wherein the fan assembly further comprises a centrifugal fan, and wherein in the suction mode the centrifugal fan rotates around a second rotary shaft.

2. The blowing-suction device according to claim 1, wherein the fan assembly further comprises a centrifugal fan, and wherein in the suction mode the centrifugal fan rotates around a second rotary shaft.

3. The blowing-suction device according to claim 1, wherein the axial fan and the centrifugal fan are both disposed in the main body.

4. The blowing-suction device according to claim 3, wherein the axial fan and the centrifugal fan are located on two sides of the motor respectively along an extending direction of the motor shaft.

5. The blowing-suction device according to claim 1, wherein the blowing-suction device further comprises a clutch device disposed between the motor and the fan assembly, the clutch device comprises a clutch and an operating mechanism for operating the clutch, and the operating mechanism operably drives the clutch to make one of the axial fan and the centrifugal fan connect the motor, and at the same time, make the other one of the axial fan and the centrifugal fan disconnected from the motor.

6. The blowing-suction device according to claim 1, wherein the blowing-suction device further comprises a clutch device located between the motor and the fan assembly, and when the motor is operated for forward or reverse rotation, the clutch device makes one of the axial fan and the centrifugal fan connect the motor, and at the same time, make the other one of the axial fan and the centrifugal fan disconnected from the motor.

7. A blowing-suction device, comprising: a main body; a motor located in the main body, the motor having a motor shaft providing rotational motion; a fan assembly located in the main body driven by the motor to make rotational motion; and a blowing-suction assembly detachably connecting to the main body; wherein: the fan assembly comprises an axial fan and a centrifugal fan, the axial fan rotates around a first rotary shaft to generate airflow suctioned from the main body and blown out from the blowing-suction assembly, the centrifugal fan rotates around a second rotary shaft to generate airflow suctioned from the blowing-suction assembly and blown out from the main body, and the motor shaft is configured to selectively connect one at a time to the first rotary shaft and the second rotary shaft.

8. The blowing-suction device according to claim 7, wherein the blowing-suction assembly comprises a blowing pipe and a suction pipe fixedly connected.

9. The blowing-suction device according to claim 8, wherein the axial fan and the centrifugal fan are both disposed in the main body.

10. A blowing-suction device, selectively operating in a blowing mode or a suction mode, the blowing-suction device comprising: a main body; a motor located in the main body, the motor having a motor shaft providing rotational motion; a fan assembly located in the main body driven by the motor to make rotational motion; and an air pipe connecting the main body, wherein: the fan assembly comprises an axial fan and a centrifugal fan, in the blowing mode the motor does not drive the centrifugal fan and the axial fan rotates to generate airflow suctioned from the main body and blown out from the air pipe, and in the suction mode the motor does not drive the axial fan motor and the centrifugal fan rotates to generate airflow suctioned from the air pipe and blown out from the main body.

11. The blowing-suction device according to claim 10, wherein the air pipe is detachably connected to different positions of the main body.

12. The blowing-suction device according to claim 10, wherein the air pipe is configured to be switched between a blowing position of the blowing-suction device in the blowing mode and a sucking position of the blowing-suction device in the suction mode.

13. The blowing-suction device according to claim 10, wherein:
the main body is provided with a first opening and a second opening,
in a blowing mode, the air pipe is mounted to the first opening,
when the blowing-suction device switches to the suction mode the air pipe is removed from the first opening and mounted to the second opening.

14. The blowing-suction device according to claim 10, wherein:
the blowing-suction device further comprises a clutch device,
the clutch device comprises a clutch and an operating mechanism for operating the clutch, and
the operating mechanism operably drives the clutch to cause one of the axial fan and the centrifugal fan to connect to the motor and cause the other one of the axial fan and the centrifugal fan to disconnect from the motor.

15. The blowing-suction device according to claim 10, further comprising a clutch device located between the motor and the fan assembly, wherein when the motor is operated for forward or reverse rotation the clutch device is configured to connect one of the axial fan and the centrifugal fan to the motor and to disconnect the other one of the axial fan and the centrifugal fan from the motor.

* * * * *

UNITED STATES PATENT AND TRADEMARK OFFICE
CERTIFICATE OF CORRECTION

PATENT NO. : 10,722,085 B2
APPLICATION NO. : 15/531226
DATED : July 28, 2020
INVENTOR(S) : Zhendong Gao et al.

Page 1 of 1

It is certified that error appears in the above-identified patent and that said Letters Patent is hereby corrected as shown below:

In the Claims

Claim 10, Column 16, Line 9, change "axial fan motor and" to --axial fan and--

Signed and Sealed this
Sixth Day of October, 2020

Andrei Iancu
*Director of the United States Patent and Trademark Office*